US008551221B2

(12) United States Patent
Wolfe

(10) Patent No.: US 8,551,221 B2
(45) Date of Patent: Oct. 8, 2013

(54) METHOD FOR COMBINING DESALINATION AND OSMOTIC POWER WITH CARBON DIOXIDE CAPTURE

(76) Inventor: Thomas D. Wolfe, Rough and Ready, CA (US)

(*) Notice: Subject to any disclaimer, the term of this patent is extended or adjusted under 35 U.S.C. 154(b) by 452 days.

(21) Appl. No.: 12/917,280

(22) Filed: Nov. 1, 2010

(65) Prior Publication Data

US 2011/0100218 A1 May 5, 2011

Related U.S. Application Data

(60) Provisional application No. 61/257,268, filed on Nov. 2, 2009, provisional application No. 61/295,703, filed on Jan. 16, 2010.

(51) Int. Cl.
*B01D 53/14* (2006.01)

(52) U.S. Cl.
USPC .......... 95/196; 210/650; 210/651; 210/652; 95/205; 95/236

(58) Field of Classification Search
None
See application file for complete search history.

(56) References Cited

U.S. PATENT DOCUMENTS

| | | | | |
|---|---|---|---|---|
| 3,130,156 | A | * | 4/1964 | Neff .............................. 210/177 |
| 6,391,205 | B1 | | 5/2002 | McGinnis |
| 6,475,460 | B1 | * | 11/2002 | Max ............................. 423/437.1 |
| 7,560,029 | B2 | | 7/2009 | McGinnis |
| 2005/0133446 | A1 | | 6/2005 | Lampi et al. |
| 2005/0145568 | A1 | | 7/2005 | McGinnis |
| 2006/0144789 | A1 | * | 7/2006 | Cath et al. ..................... 210/641 |
| 2006/0260290 | A1 | * | 11/2006 | Rao .............................. 60/39.53 |
| 2009/0007778 | A1 | * | 1/2009 | Zhang .............................. 95/25 |
| 2010/0083828 | A1 | * | 4/2010 | Duncan et al. ..................... 95/13 |
| 2010/0089110 | A1 | * | 4/2010 | Duncan et al. ..................... 71/60 |

OTHER PUBLICATIONS

R. McGinnis et al, "A novel ammonia-carbon dioxide osmotic heat engine for power generation", Journal of Membrane Science, 305:13-19 (Nov. 2007).
T. Cath et al, "Forward osmosis: principles, applications, and recent developments", Journal of Membrane Science, 281:70-87 (2006).
R. McGinnis et al, "Energy requirements of ammonia-carbon dioxide forward osmosis desalination", Desalination, 207:370-382 (2007).
J. McCutcheon et al, "A novel ammonia-carbon dioxide forward (direct) osmosis desalination process", Desalination, 174:1-11 (2005).
T. Wolery et al, "Fresh water generation from aquifer-pressured carbon storage: Annual Report FY09", Lawrence Livermore National Laboratory, LLNL-TR-420857, pp. 1-44 (Dec. 1, 2009).
K. Eaton, "Salinity power plants may be the next eco-power generating tech", www.fastcompany.com (Feb. 26, 2009).
E. Gal et al, "Chilled ammonium process (CAP) for post combustion CO2 capture", 2nd Annual Carbon Capture and Transportation Working Group Workshop, Palo Alto, California (Mar. 23, 2006).
F. Alix et al, ECO2 technology—basin electric power cooperative's 120 MWe CCS demonstration, MIT Carbon Sequestration Forum IX, Powerspan Corp., (Sep. 16, 2008).
S. Skilhagen, "Osmotic power—a new, renewable energy source", WIREC 2008, Statkraft Pure Energy (Mar. 2008).
Statkraft Pure Energy, "Osmotic power", www.statkraft.com (Apr. 2007).

* cited by examiner

*Primary Examiner* — Duane Smith
*Assistant Examiner* — Phillip Shao
(74) *Attorney, Agent, or Firm* — McHale & Slavin, P.A.

(57) ABSTRACT

Carbon Dioxide capture processes utilizing ammonia, or ammonia in water as the capture fluid for carbon dioxide generate concentrated solutions of ammonium carbonate species in water, which are subsequently decomposed to capture the carbon dioxide and recycle the ammonia. Forward osmosis processes utilize ammonium carbonate species as draw solutions to pull water from saline solutions such as seawater in the ammonium carbonate solution. The ammonium carbonate solution is then heated to decompose the ammonium carbonate to ammonia and CO2 which are both reused, while a portion of the aqueous stream is recovered as pure water. Combination of carbon capture process with an integrated forward osmosis process provide great economies over standalone operations. Furthermore, the very high concentrations of ammonium carbonate provide a further opportunity to include osmotic power recovery cycles with the integrated forward osmosis and carbon capture process.

19 Claims, 3 Drawing Sheets

METHOD FOR COMBINING DESALINATION AND OSMOTIC POWER WITH CARBON DIOXIDE CAPTURE

CROSS REFERENCE TO RELATED APPLICATION

This patent application claims priority from U.S. Provisional Patent Application No. 61/257,268, filed Nov. 2, 2009, entitled "Method for Combining Desalination with CO2 Capture" and from U.S. Provisional Patent Application No. 61/295,703, filed Jan. 16, 2010, entitled "Method for Combining Desalination and Osmotic Power with CO2 Capture", the contents of which are herein incorporated by reference.

FIELD OF THE INVENTION

This invention is related to the fields of desalination water treatment, osmotic power generation, and carbon dioxide capture, and in particular, to a method for combining a carbon capture process with a desalination process in a manner which decreases the cost of both processes. Similarly this invention relates to coupling an osmotic power process and desalination process to the carbon capture process which results in similarly improved overall process economics.

BACKGROUND OF THE INVENTION

Carbon dioxide capture is the first step in Carbon Capture and Sequestration processes. Several methods of carbon capture are in use on a semi-commercial basis. These can be described as Amine Capture, Ammonia Capture, and Water/Alkaline Capture. The Ammonia Capture process is the carbon capture process which relates to this invention.

Ammonia Capture Process

In the ammonia capture process, a concentrated solution of ammonia in water, either cooled or at ambient or higher temperature, is contacted with a gas stream containing carbon dioxide, such as power plant flue gas, cement kiln gas or even possibly air. Carbon dioxide reacts with the ammonium based ions in the water and ammonia solution producing in effect a mixture of ammonia, ammonium carbonate, ammonium bicarbonate, and ammonium carbamate in water. In this discussion we will use the term ammonium carbonates to refer to all species formed during the reaction of ammonia with carbon dioxide. Given sufficient ammonia added to the solution, eventually a very high concentration of ammonium carbonate species can be reached and either solid crystals or a very concentrated solution is produced. The crystals of ammonium carbonates along with the concentrated solution can be decomposed under mild conditions, releasing ammonia and carbon dioxide as gases. Ammonia can be separated from the CO2 using a variety of means, including cold condensing surfaces which liquefy the ammonia. This separation allows the carbon dioxide to pass through the system as a gas and be compressed into a liquid form for later sequestration or use. The liquid ammonia is now available for recycle to capture additional carbon dioxide. No desalination is accomplished in this standalone process.

Typical examples of this approach include the ECO2 process from Powerspan or the Alstrom CAP—Chilled Ammonia Process. The presentation entitled "ECO2 Technology—Basin Electric Power Cooperative's 120 MWe CCS Demonstration", Alix et al, MIT Carbon Sequestration Forum IX, 2008 provides a very detailed overview of the ammonia based carbon capture process and economics. Also the presentation "Chilled Ammonium Process (CAP) for Post Combustion CO2 Capture," Gal et al, $2^{nd}$ Annual Carbon Capture and Transportation Workshop, California, March 2006 provides details of the chilled ammonia process and economics.

Forward Osmosis Process

An entirely different process called "forward osmosis" is currently being developed to desalinate saline and contaminated waters. In this forward osmosis process a "draw solution" is used to create an osmotic pressure differential and the water to be desalinated is "drawn" through an osmotic membrane into the draw solution. In osmotic membranes the water passes preferentially through the membrane over salts dissolved in the water, resulting in a desalination. The water is then separated from the draw solution as purified or desalinated water and the draw solution is reused. The water to be desalinated, as is amply described in the references, may range from seawater, to oil or gas produced waters, to industrial and municipal wastewaters. The common feature of these waters to be desalinated is that they all contain dissolved salts above the level at which the water can be used for any particular purpose such as potable water, agricultural irrigation water, or cooling tower makeup. "Forward osmosis: Principles, applications, and recent developments," Elimelech et al, Journal of Membrane Science 281 (2006) 70-87 provides a basic review and detail discussion of the process and its applications.

In one variation of this forward osmosis technique the "draw solution" is based on ammonium bicarbonate (in this application I treat the term ammonium carbonate solution as a mixture of ammonia, ammonium, carbonate, bicarbonate, carbamate, and CO2 species as will be readily apparent to anyone skilled in the art). Ammonium carbonate in high concentration exhibits a very high osmotic pressure and when separated from seawater by an osmotic membrane, water (but not salts) permeates the membrane and flows into the draw solution. The draw solution is now somewhat diluted. To recover the water, the ammonia and carbon dioxide needs to be recovered from the draw solution. This is typically accomplished by heating the solution, causing the ammonia and carbon dioxide to vaporize from the solution where they can be recovered and re-dissolved in water to create more draw solution. Of course, in a large scale setting this will be done on a continuous basis. The paper "A novel ammonia-carbon dioxide forward (direct) osmosis desalination process," J. R. McCutcheon et al./Desalination 174 (2005) 1-11 describes this system in detail. U.S. Pat. Nos. 6,391,205 and 7,560,029 as well as US Patent Application No. 20050145568 describes similar processes.

Osmotic Power

Another yet entirely different yet related process called Osmotic Power, or direct osmosis or pressure retarded osmosis or salinity gradient osmosis is also currently being developed and used to generate osmotic power. In this process, fresh water is contacted through a semi-permeable membrane against a more concentrated solution. Water flows from the freshwater into the more concentrated water. If the concentrated water side is constrained in volume, a pressure develops which can ultimately equal the osmotic pressure differential between the two solutions. Typically this process is applicable to areas where fresh water rivers empty into the sea. The osmotic power process is currently in large scale prototype development, primarily in Europe. The Norwegian company StatKraft is the current leader in the process. Background information can be found in references such as Stein Erik Skilhagen—Osmotic Power presentation March 2008 at Wirec 2008 or in "Salinity Power Plants May be the Next Eco-Power Generating Tech," by Kit Eaton, Feb. 26, 2009 in FastCompany (www.fastcompany.com).

Osmotic Power Heat Engines are also described by Elimelech et al in "A novel ammonia-carbon dioxide osmotic heat engine for power generation," Journal of Membrane Science 305 (2007) 13-19. In these applications, power is produced through a combination of forward osmosis of high purity distilled water into a concentrate of ammonium carbonates. This produces a pressurized, but now diluted ammonium carbonate stream. The pressure energy is recovered via a turbine or work exchanger device and the diluted draw solution is reconstituted using heat in the typical manner of forward osmosis. No net desalinated water is in the process and the recovered water from the draw solution is recycled back to the process.

SUMMARY OF THE INVENTION

The instant invention provides processes to combine ammonia based capture of carbon dioxide with osmotic power generation and forward osmosis desalination processes providing surprisingly good energy efficiency improvements.

Forward Osmosis Desalination with Ammonia Capture of Carbon Dioxide

In one embodiment of my invention, the ammonia capture process is combined with forward osmosis desalination to provide superior economics to either process alone. Consider the ammonia capture process. Ammonia is reacted with carbon dioxide gas with the resultant solution pregnant with capture carbon dioxide. To recover the carbon dioxide and recycle the ammonia, the solution must be heated to decompose the ammonium carbonate species. This requires energy input, largely determined by the mass of ammonium carbonate to decompose (the heat of reaction). This energy is the primary energy cost of the carbon capture process and the total process capturing 90% of the CO2 from a coal fired power plant may consume as much as 20-30% of the entire output of the coal fired power plant.

In the forward osmosis process, a solution of concentrated ammonium carbonate species is used to "draw" water through a membrane into the ammonium carbonate solution. Once sufficient water is drawn into the ammonium carbonate solution that the osmotic pressure differential is diminished, the draw solution must be regenerated by heating to decompose the ammonium carbonate, leaving pure water behind as a product. Once again the heat required is decompose the ammonium carbonate solution. For desalination, the recovery of both constituents and subsequent re-reaction of the CO2 with ammonia is a critical step in the process.

The combination of the two processes results in better economics and a more facile overall process. A coal fired power plant generates large quantities of CO2 and consumes large quantities of relatively fresh water in its cooling towers. Thus combining desalination with carbon capture will reduce overall operating costs or allow siting of the plant at areas with adequate but poor quality water supplies. In addition, the crucial energy consuming step within both processes—ie the heating of the water to decompose the ammonium carbonates—is required only one time to achieve both goals. This two for one combination is what makes the instant invention valuable as a new combined process for simultaneously recovering carbon dioxide and producing desalinated water. In addition, the combination of the two processes reduces the amount and cost of the capital equipment required over standalone operations.

Forward Osmosis Desalination Combined with Osmotic Power Generation Coupled with Ammonia Capture of Carbon Dioxide In the second embodiment of this invention additional energy can be drawn from the combined process by including a direct osmosis osmotic power component to the system. The ammonium carbonate solution generated by the carbon capture process is very high in concentration with a concomitantly high osmotic pressure. In fact the osmotic pressure differential between brackish water and the ammonium carbonate stream may be so high that the differential may be partially used to generate power and partially used to generate desalinated water. While Elimelech et al described the "osmotic heat engine" using ammonia carbonates and distilled water, they did not contemplate the use of the combined process for desalination, possibly because the overall costs of power generation would have been simply uneconomic to pursue. However, combined with a source of ammonium carbonates and the unrelated need to separate the components to recover carbon dioxide for carbon capture purposes, the economics are far more attractive.

Consider the first embodiment of the invention—that is the combination of forward osmosis with ammonia carbon capture. If the operating pressure on the ammonium carbonate side of the forward osmosis unit is raised to some higher pressure, say several hundred psi, the differential of osmotic pressure to the operating pressure will still be sufficient to "draw" desalinated water through the membrane. Suppose for example 100 l/min of ammonium carbonate solution is raised to 20 bar using a pump. This is fed to the forward osmosis unit and seawater or other brackish water can be "drawn" into the ammonium carbonate solution even under pressure. Leaving the forward osmosis unit we may now have say 200 l/min of now diluted draw solution under almost 200 psi. The energy in this 200 l/min at 200 psi may be extracted to operate the incoming pump with the remaining energy in the stream recovered as electrical or kinetic energy thru a small hydro turbine generator, or other similar device as will be readily appreciated. Once again, the energy to decompose the ammonium carbonate needs only be applied one time to power two processes, resulting in superior economic performance.

Common to both embodiments is the concept that CO2 makeup is no longer an issue since large amounts of CO2 are generated continuously. In the standalone forward osmosis process, capture and recovery of CO2 is crucial to the economics and "green" appeal of the process.

Objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE PREFERRED EMBODIMENT

Figure 1:
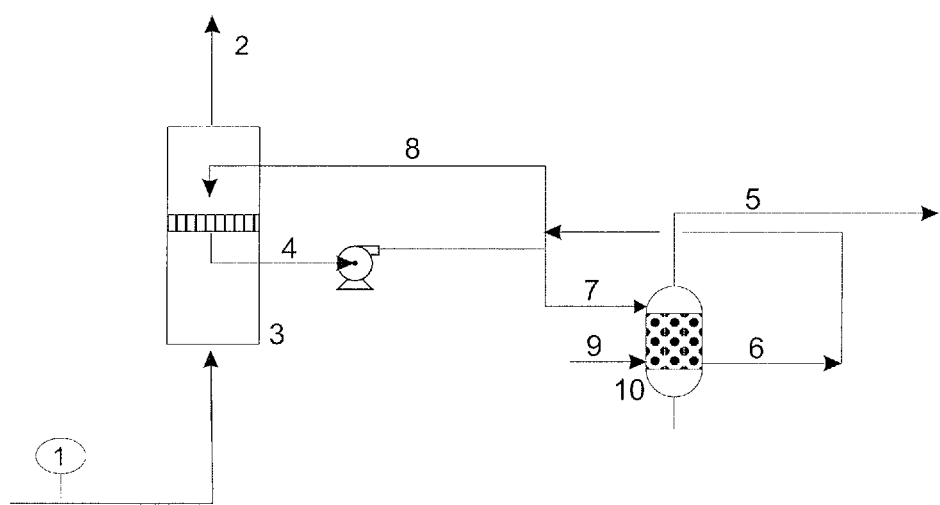
FIG. 1 is a pictorial representation of a typical ammonia based carbon capture process showing the Carbon Dioxide scrubber/capture apparatus. There are many variations to this process and this drawing is simplified. However the basic process consists of a gas contacting chamber [3] wherein the CO2 containing stream [1] is contacted with an ammonia concentrate stream [8], generating an ammonium carbonate stream [4]. The ammonia carbonate stream [4] is partially recycled to the gas contacting chamber [3] with essentially pure ammonia [6] added before return to the gas contacting chamber. The ammonium carbonate stream, in some variations of the process, may be allowed to concentrate past the point at which ammonium carbonate becomes insoluble and subsequently crystals form. Some of stream [4] is taken as blowdown stream [7] to the CO2/NH3 separator device [10] wherein heat [9] is used to separate the ammonia [6] which is returned to the process from CO2 [5] which is then compressed or otherwise handled.
Figure 2:
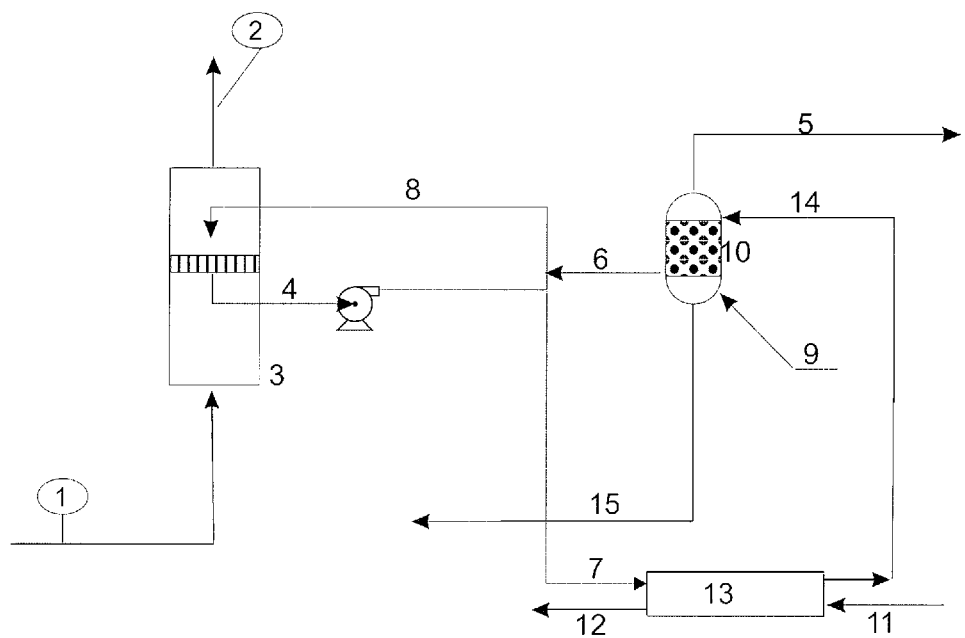
FIG. 2 shows the same process with forward osmosis (FO) unit [13] integrated into the system. The FO unit (13), as is well known to those skilled in the art, has a semipermeable membrane which effectively allows only water to pass through. The membrane is exposed to a solution of salts in water to be desalted, the water for desalination [11-12] on one side of the membrane, and a draw solution of higher concentration on the other side of the membrane [7] through [14]. Feed to the FO unit consists of water for desalination [11] on one side and on the other side of the membrane, the draw solution [7] consisting of the concentrated ammonium carbonate solution coming from the carbon dioxide and ammonia contactor apparatus [3]. If the carbon dioxide capture process is operated in one of the many variations such that crystals of ammonium carbonate are formed, then with most conventional forward osmosis systems, the crystals must not enter the FO membrane section. This is easily achieved by separating the crystals from the ammonium carbonate stream by well-known techniques for solid/liquid separation such as filtration, settling tanks, or centrifugation to name but a few. As an alternate method the crystals in the concentrated ammonium carbonate stream could be partially decomposed first. This could be accomplished by dilution with water which will allow the crystals to dissolve, or heating to move the solubility point upwards, or heating to allow some gaseous CO2 and NH3 to form first. Inside the FO unit water from the desalinated stream permeates under the differential osmotic pressure into the draw solution [7] becoming stream [14]. Stream [7] is the carbon dioxide capture blowdown stream which in this embodiment becomes the FO draw solution. The draw stream, now diluted with water [14] is fed to the CO2/NH3 separator device and returned to the process. The excess water, now depleted in ammonia and carbon dioxide is desalinated [15] and available for reuse as fresh water. While this stream may contain residual ammonia and carbon dioxide it is generally suitable for many fresh water uses and any residual ammonia can be removed by processes well known to those skilled in the art of water treatment.
Figure 3:
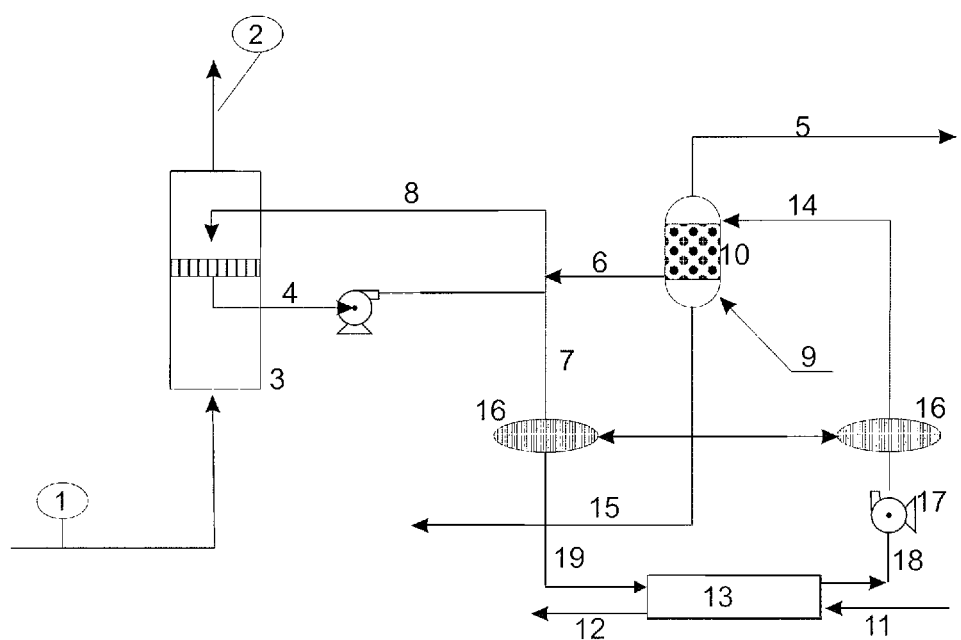
FIG. 3 shows the same process with the addition of osmotic power recovery devices. The FO draw stream [7] is pressurized to an operating pressure in pump or work exchanger device [16] and fed as a pressurized stream [19] to the FO device [13]. Water to be desalinated [11] is fed under low pressure to the FO device [13] and permeates the osmotic membrane to dilute the pressurized draw stream and simultaneously raise its pressure. The pressure is recovered in hydro turbine [17] as electrical energy or work energy. For example, hydro turbine [17] could be realized as a turbocharger device and used to help raise the pressure of boiler feedwater to the plant. This same turbocharger could also assist in the pressurization of the recovered CO2. Lowered to the input pressure, the dilute stream is passed through a work exchanger device [16] providing most of the energy needed to pressurize the stream to the operating pressure. Ammonia and carbon dioxide are separated in [14] as described above.

Although the invention will be described in terms of specific embodiments, it should be obvious to one skilled in the art that many flow path variations and equipment choices are possible. While specific embodiments of the instant invention are disclosed herein, it is to be understood that the embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Although many proponents of FO processes assume that waste heat is utilized in the process, in practice waste heat is difficult to utilize. Of more practical examples we turn to the ammonia capture process in which heat is used to drive the ammonia/CO2 separator. In typical systems, some 400-500 btu of energy per pound of CO2 is required as shown in "ECO2 Technology—Basin Electric Power Cooperative's 120 MWe CCS Demonstration", Alix et al, MIT Carbon Sequestration Forum IX, 2008. This excludes CO2 pressurization. If we assume for example that the ammonium carbonate concentration of the stream being separated is around 5 molar, then we can convert this energy to a per cubic meter cost. 5 M contains 5*44*2.2=484 lb/CO2. 484 lb*500 btu/lb*1 kwh/3414 btu=~70 kwh/m^3 of solution. Of this one cubic meter of solution, the amount of water is about 0.8 m^3. Thus the energy use per cubic of water is about 70/0.8=87.5 kwh/m^3. Of course not all of this energy is thermal and some small amount of electrical energy is required. However this energy input compares to the estimated FO energy input from "Energy requirements of ammonia-carbon dioxide forward osmosis desalination," Elimelech et al, Desalination 207 (2007) 370-382 which estimates that approximately 75 kwh/m^3 of thermal energy is required depending on the draw solution concentration at the end point.

It is clear from the above analysis that the FO desalination step can be accomplished for very little additional thermal energy input—say in the order 0 to 5 kwh/m^3 of water desalinated. Although 5 kwh/m^3 is above the nominal seawater reverse osmosis (RO) desalination energy usage of say 3 kwh/m^3, RO requires electrical energy, not thermal energy. In our example, assume that thermal energy costs are directly related to natural gas and are in the order of $5/million btu. This is in thermal kwh $5/293 kwh=$0.017/kwh. Total cost of additional energy is therefore about $0.017/kwh*5 kwh/m^3=$0.085/m^3. Compare this to RO using electrical energy at $0.10/kwh and the cost is 3*$0.10=$0.30/m^3. The savings are over 3 times, which shows that the opportunity for delivering lower cost desalinated water is very high.

In addition, one further advantage to combining the two processes is that the capital equipment required for carbon capture and FO is essentially identical and does not need to be purchased twice. In fact, only the membrane portion of the plant is required, and in typical seawater reverse osmosis systems, the membranes are in the order of 10% of the entire plant cost. The same ammonia/CO2 separators are used in both processes, producing once again unanticipated saving from combining the processes.

In another example, consider a coal fired power station capturing carbon dioxide. The recovered CO2 is pressurized into a liquid and in many scenarios it is anticipated that this CO2 will be pumped into an underground saline water reservoir. The salinity of these reservoirs range from 10,000 ppm to well over seawater concentrations. See for example "Fresh Water Generation from Aquifer-Pressured Carbon Storage: Annual Report FY09," LLNL-TR-420857, Wolery et al for examples. Most of these reservoirs are located in remote areas and the CO2 must be transported long distances from the power station. While these sites are remote from people they are usually remote from fresh water supplies. Coal fired stations use immense quantities of water in cooling towers so siting requires a fresh water supply. The instant invention provides for a method to obtain the fresh water needed for the cooling supply from the saline water displaced by injected carbon dioxide. Were the power station to attempt to provide the needed freshwater by conventional desalination of the saline waters, the additional energy and capital costs would be prohibitive. However, if most of the energy cost is already being expended for capturing carbon dioxide then the incremental cost for providing desalinated water is quite low.

A typical 1 GW coal plant emits some 7 millions tons of $CO_2$ per year. Assuming capture of say 6 millions tons, the $CO_2$ would displace about 5-6 millions gallons of water per day (7.5 million cubic meters per year). A 1 GW conventionally cycle and wet cooled coal fired power station requires about 2.5 times this amount of water each year. However, the FO process coupled with a carbon capture process could conceivably recover 2-3 lbs of water per pound of $CO_2$ captured, so the operating requirements could be supplied by the integrated process.

If a 1 GW plant with carbon capture was sited at a coastal location, the need for cooling water is supplied by the ocean. However the combination of the two processes could potentially produce an desalinated stream of 6-10 million gallons per day. In addition, the FO process can be operated at low "water recovery" in an economic manner, not like RO systems, which reduces the environmental impact of the rejected more saline concentrate stream.

Finally, at coastal stations the combination of FO, osmotic power, and carbon capture could produce desalinated at pressures suitable for the fresh water distribution system at very little incremental cost.

As will be clear to one skilled in the art of water and chemical engineering, modification the particular arrangement of the process can be made whiles still remaining within the spirit of this invention. All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A process for simultaneously capturing carbon dioxide from a carbon dioxide containing gas stream and producing desalinated water from a saline water source via forward osmosis; wherein the carbon dioxide is captured using a solution of ammonia in water.

2. The process of claim 1 wherein the desalinated water is produced using a draw solution in said forward osmosis comprised of various concentrations of ammonia and carbon dioxide in water.

3. The process of claim 1 wherein the concentrated solution of carbon dioxide in ammonia and water is used directly as the draw solution in a forward osmosis system.

4. The process of claim 1 wherein the concentrated solution of carbon dioxide in ammonia and water contains solid crystals of ammonium carbonate species and is first treated to separate the crystals from the concentrated solution before entering the forward osmosis system.

5. The process of claim 1 where the said solid crystals are decomposed to constituent parts before entering the forward osmosis system.

6. The process of claim 1 wherein the saline water is seawater.

7. The process of claim 1 wherein the saline water is cooling tower blowdown.

8. The process of claim 1 wherein the saline water is underground saline water.

9. The process of claim 1 wherein the saline water is wastewater.

10. The process of claim 1 wherein the carbon dioxide gas stream is flue gas from one of a coal fired, natural gas fired, other type thermal power station.

11. The process of claim 1 wherein the carbon dioxide gas stream is air.

12. The process of claim 1 wherein the carbon dioxide gas stream is flue gas from a cement kiln.

13. The process of claim 1 for simultaneously capturing carbon dioxide from a carbon dioxide containing gas stream and producing desalinated water from a saline water source via forward osmosis, enhanced by the operation of the forward osmosis system as part of an osmotic power recovery system.

14. The process of claim 13 wherein the pressure in the forward osmosis system generated by the osmotic pressure differential of the desalinated stream and the draw solution is recovered in a high pressure power recovery turbine.

15. The process of claim 13 further enhanced by exchanging part of the high pressure draw solution discharge from the forward osmosis system with a power recovery turbine and subsequently exchanging the remaining high pressure draw solution discharge with the incoming draw solution via a pressure exchanger device.

16. The process of claim 13 wherein the increased pressure rise required between the draw solution feed and operating pressure in the forward osmosis system draw solution is provided by a pump-on the low water concentration side.

17. The process of claim 13 wherein the CO2 and NH3 decomposition and stripping step are accomplished at elevated pressure, said pressure lower than or equal to the forward osmosis draw solution pressure as measure at the inlet of said high pressure power recovery turbine.

18. The process of claim 14 wherein a high pressure power recovery turbine is substituted with a turbocharger type device.

19. The process of claim 18 wherein the said turbocharger device recovers power from high pressure water and transfers this power to the compression step of recovered carbon dioxide stream.

* * * * *